(12) United States Patent
Harik et al.

(10) Patent No.: US 7,685,236 B1
(45) Date of Patent: Mar. 23, 2010

(54) METHODS AND SYSTEMS FOR DEVELOPING AN INSTANT MESSAGING NETWORK

(75) Inventors: Georges Harik, Mountain View, CA (US); John Piscitello, San Francisco, CA (US)

(73) Assignee: Google Inc., Mountain View, CA (US)

( * ) Notice: Subject to any disclaimer, the term of this patent is extended or adjusted under 35 U.S.C. 154(b) by 1630 days.

(21) Appl. No.: 10/815,901

(22) Filed: Mar. 31, 2004

Related U.S. Application Data

(60) Provisional application No. 60/505,678, filed on Sep. 24, 2003.

(51) Int. Cl.
*G06F 15/16* (2006.01)
*G06F 12/00* (2006.01)

(52) U.S. Cl. ........................ 709/205; 709/206
(58) Field of Classification Search .................. 709/207, 709/206, 203, 217–218, 250
See application file for complete search history.

(56) References Cited

U.S. PATENT DOCUMENTS

| 6,301,609 | B1 | 10/2001 | Aravamudan et al. | |
|---|---|---|---|---|
| 6,404,884 | B1* | 6/2002 | Marwell et al. | 379/265.13 |
| 6,430,602 | B1 | 8/2002 | Kay et al. | |
| 7,266,583 | B2* | 9/2007 | Fitzpatrick et al. | 709/205 |
| 2002/0023132 | A1* | 2/2002 | Tornabene et al. | 709/205 |
| 2002/0198008 | A1* | 12/2002 | Smith et al. | 455/466 |
| 2004/0186887 | A1* | 9/2004 | Galli et al. | 709/206 |

OTHER PUBLICATIONS

U.S. Appl. No. 60/505,678, Harik et al.

* cited by examiner

*Primary Examiner*—Zarni Maung
(74) *Attorney, Agent, or Firm*—Blakely, Sokoloff, Taylor & Zafman LLP

(57) ABSTRACT

An instant messaging (IM) system has an IM server connected to a communication network, and logic operable on the IM server enabling a first user to browse contacts associated with a second user. In some cases the first user can add and list contacts accessed by browsing the contacts associated with the second user.

42 Claims, 6 Drawing Sheets

METHODS AND SYSTEMS FOR DEVELOPING AN INSTANT MESSAGING NETWORK

CROSS-REFERENCE TO RELATED DOCUMENTS

The present invention claims priority to provisional patent application Ser. No. 60/505,678 entitled "Methods and Systems for Developing an Instant Messaging Network", filed on Sep. 24, 2003.

FIELD OF THE INVENTION

The present invention is in the area of network communication systems, and relates more particularly to methods and systems for facilitating increased use of instant messaging networks.

BACKGROUND OF THE INVENTION

Instant messaging networks in the current art, examples of which include AOL Instant Messenger and MSN Messenger, among others, have increasingly gained popularity as a form of on-line activity, at least in part because they allow users to communicate with one another in a virtually real-time manner, providing what amounts to online conversation. There are many similarities in such systems, and examples of such systems in current art have been described, for example, in U.S. Pat. No. 6,430,602, entitled "Method and System for Interactively Responding to Instant Messaging Requests," issued on Aug. 6, 2002 to Kay et al., and U.S. Pat. No. 6,301,609, entitled, "Assignable Associate Priorities for User-Definable Instant Messaging Buddy Groups," issued on Oct. 9, 2001 to Aravamudan et al., both of which are incorporated herein in their entirety by reference. These references provide considerable detail about architecture and other details of state-of-the-art instant messaging systems, reproduction of which should not be necessary in the present application.

Online messaging systems in the art at the time of the present patent application are typically proprietary systems requiring installation of software on a user's computer, and as a result, typically the user of a particular instant messaging system, such as AOL Instant Messenger, can only communicate with users of the same system.

Further to the above, prior art instant messaging networks are relatively difficult to set up, at least in part because of certain effects stemming from characteristics of an overall network. For example, for such a network to be useful, there should be a relatively large number of users. This fact can pose a significant challenge to relatively small, start-up instant messaging operators which may not have the resources to build a network of a large number of users in a relatively short time. Relatively small telephone companies had similar difficulty competing with larger ones in the early growth of publicly switched telephone networks (PSTN) in the early 1900s.

Typically, a provider of an instant messaging system relies on existing users to find one another's contact information and to invite new users to join the particular system. A mechanism that is often employed to facilitate such growth in the system is to provide each user a unique screen name and in turn, to allow each user to maintain a list of contacts by screen name (sometimes called buddy lists in the art) who also are enabled and have access to the same messaging system. As more users are added to the particular instant messaging system and/or existing users add additional users to their buddy lists, the particular instant messaging system grows. Generally speaking, the more users with which each user is enabled to communicate in an instant messaging system, either through addition of new users or by allowing more existing users to find each other and communicate, the more successful the particular instant messaging system will be.

To allow users to find each other and to add more contacts to their own buddy lists, which facilitates growth and functionality of the system, users of existing systems may be enabled to perform textual searches using screen names or other information relating to other users as search criteria, and then add users, one at a time, to their buddy lists. Further, a user may invite others to join the network, such as by sending an email to the potential new user. In both of these situations one user is trying to establish communication with one other user, who may or may not yet be a member to the particular instant messaging network, and the seeking user needs to obtain the contact information of the target user.

Growing an instant messaging system using the prior art techniques described above may take considerable time, during which period existing users may cease using the system due to a lack of sufficient other users with whom to communicate. Furthermore, an existing user may have difficulty obtaining the necessary contact information, such as email, screen names, and so on, of other persons who may or may not belong to the network.

What is clearly needed to enable more rapid growth of new instant messaging systems is a method and mechanism that provides a more robust ability to find and list current members, and to add new members to the system.

SUMMARY OF THE INVENTION

In an embodiments of the invention an instant messaging (IM) system is provided comprising an IM server connected to a communication network, and logic operable on the IM server enabling a first user to browse contacts associated with a second user. In some embodiments the network is the Internet network, and in some embodiments the logic additionally enables the first user to add and list contacts accessed by browsing the contacts associated with the second user.

In some embodiments of this system the second user groups contacts in distinct separate lists, and the first user is enabled to browse contacts in only the second user's list that includes the first user as a contact. Also in some embodiments there may be further a means operable for the second user to enable and disable access by the first user to individual ones or lists of contacts associated with the second user. Further in some embodiments there may be a means for the first user to select a screen name from the contacts of the second user, which selection adds the selected screen name as a contact for the first user. In some cases the means for a user to select a screen name may be an interactive list displayed to the first user on a display screen of a first computerized appliance connected to the IM network and executing a first instance of client logic of the IM system.

In some embodiments of the system the second user's contacts are stored and displayed on a second computerized appliance executing a second instance of client logic of the IM system. Also in some embodiments, upon the first user selecting a screen name from the contact list of the second instance, the second instance sends a message to a third instance of the IM client on the network, the third instance registered to a person using the selected screen name, the message alerting the person using the selected screen name that the first user is adding his name to the first user's contact list.

Still further in some embodiments the second instance, upon the first user selecting a name from the contact of the second instance, may act as an intermediary, sending at least a message to a third instance of the IM client registered to the person using the selected screen name, the message seeking approval for addition of the selected screen name to the contact list of the first instance. In some cases the second instance, upon the first user selecting a screen name from the contact list of the second instance, sends messages to both the third instance registered to the person using the selected screen name, and also to the first user at the first instance, providing introductory information to each of the two users about the other of the two users. Still further in some cases the two messages sent may also seek response from the two users granting or withholding authorization for the addition of each user's screen name to the other user's contact list.

In another aspect of the invention an instant messaging (IM) system is provided comprising a repository storing profile information about individual users, and a description-based search means executable by users to search the repository for one or more other users based on search criteria entered by the searching user. In some embodiments the search may be conducted without regard to a field. Also in some embodiments the search may be performed on a keystroke by keystroke basis. Still further in some embodiments the search criteria may be imported user information. Also in some cases the imported information may be a telephone number or a digital address imported from a cellular telephone or a personal digital assistant.

In another aspect of the invention a method for providing new contacts to users of an instant messaging (IM) network is provided, comprising receiving a field-independent search query, and performing a search of stored user profile information using the query. In some embodiments of this method there is a further action for providing contact information resulting from the search to a user initiating the search query.

In still another aspect of this invention a method for expanding an instant messaging (IM) system is provided, comprising providing at least first and second instances of an IM client on first and second computerized appliances respectively on a network, and providing a browsing means in the first instance of the IM client to allow browsing screen names in a contact list of the second instance by a first user of the first instance. In some embodiments there may be further an act for initiating the browsing function by selecting one of a menu line item or an interactive icon in an interactive interface on a display screen one of the computerized appliances. In some cases of this method the network may be the Internet network and one or more of the computerized appliances may be personal computers connected to the Internet.

In still other embodiments of the method there may be a further act for a user of the second instance to enable or disable access by the browsing user of the first instance for individual ones or groups of contacts in contact lists of the second instance. There may also be a further act for selecting a screen name from the contact list of the second instance, which adds the selected screen name as a contact in the contact list of the first instance. In some cases there may be an act for displaying an interactive list of contacts from a contact list of the second instance in a display window of the first computerized appliance, and in some cases the second instance, upon the first user selecting a name from the contact list of the second instance, may send a message to a third instance of the IM client on the network, the third instance registered to the person using the selected screen name, the message alerting the person using the selected screen name that the first user is adding his name to the first user's contact list.

In some embodiments the second instance, upon the first user selecting a name from the contact of the second instance, acts as an intermediary, sending at least a message to a third instance of the IM client registered to the person using the selected screen name, the message seeking approval for addition of the selected screen name to the contact list of the first instance. Also in some embodiments the second instance, upon the first user selecting a screen name from the contact list of the second instance, sends messages to both the third instance registered to the person using the selected screen name, and also to the first user at the first instance, providing introductory information to each of the two users about the other of the two users. The two messages sent may also seek response from the two users granting or withholding authorization for the addition of each user's screen name to the other user's contact list.

In yet another aspect of the invention a method for expanding an IM network is provided, comprising providing network communication between a first and second user such that each is listed by the other as a contact, and making other contacts of the first user available for selection by the second user for addition to the second user's contact list. In some embodiments the network may be the Internet network. Also in some embodiments the second user may group contacts in distinct separate lists, and the first user may be enabled to browse contacts in only the second user's list that includes the first user as a contact.

Also in some embodiments of this method there may further be an act for the second user enabling and disabling access by the first user to individual ones or lists of contacts associated with the second user. Still further, there may be an act for the first user selecting a screen name from the contacts of the second user, which selection adds the selected screen name as a contact for the first user. In some embodiments the second user may select a screen name from the contact list of the first user, and the first user may cause a message to be sent to a third user, the third user being the person using the selected screen name, the message alerting the third user that the second user is adding the third user to the second user's contact list.

Further in some embodiments the first user, upon the second user selecting a name from the contact of the first user, may act as an intermediary, sending at least a message to a third user being the person using the selected screen name, the message seeking approval for addition of the selected screen name to the contact list of the second user. Still further in some embodiments the first user, upon the second user selecting a screen name from the contact list of the first user, may send messages to both the third user, being the person using the selected screen name, and also to the second user, providing introductory information to each of the second and third users about the other of the second and third users. In still another embodiment the messages sent may also seek response from the second and third users granting or withholding authorization for the addition of each user's screen name to the other user's contact list.

In yet another aspect of the invention a machine-readable medium is provided having stored thereon a set of instructions that cause a machine to perform a method for providing new contacts to users of an instant messaging (IM) network. The method comprises acts for receiving a field-independent search query, and performing a search of stored user profile information using the query. In some embodiments of the method there may be a further action for providing contact information resulting from the search to a user initiating the search query.

In still another aspect of the invention a machine-readable medium is provided having stored thereon a set of instructions that cause a machine to perform a method for expanding an IM network, wherein the method comprises providing network communication between a first and second user such that each is listed by the other as a contact, and making other contacts of the first user available for selection by the second user for addition to the second user's contact list.

In some embodiments of the method the network may be the Internet network. Also in some the second user may group contacts in distinct separate lists, and the first user may be enabled to browse contacts in only the second user's list that includes the first user as a contact. In some embodiments there may be further an act for the second user enabling and disabling access by the first user to individual ones or lists of contacts associated with the second user. In still further embodiments there may be an act for the first user selecting a screen name from the contacts of the second user, which selection adds the selected screen name as a contact for the first user.

In some embodiments of the method the second user may select a screen name from the contact list of the first user, and the first user may cause a message to be sent to a third user, the third user being the person using the selected screen name, the message alerting the third user that the second user is adding the third user to the second user's contact list. Also in some embodiments the first user, upon the second user selecting a name from the contact of the first user, may act as an intermediary, sending at least a message to a third user being the person using the selected screen name, the message seeking approval for addition of the selected screen name to the contact list of the second user. In still further embodiments the first user, upon the second user selecting a screen name from the contact list of the first user, may send messages to both the third user, being the person using the selected screen name, and also to the second user, providing introductory information to each of the second and third users about the other of the second and third users. And in still further embodiments the messages sent may also seek response from the second and third users granting or withholding authorization for the addition of each user's screen name to the other user's contact list.

In embodiments of the invention taught below in enabling detail, for the first time an instant messaging system is provided with robust ability to find and list current members, and to add new members to the system.

BRIEF DESCRIPTION OF THE DRAWING FIGURES

DESCRIPTION OF THE PREFERRED EMBODIMENTS

Figure 1:
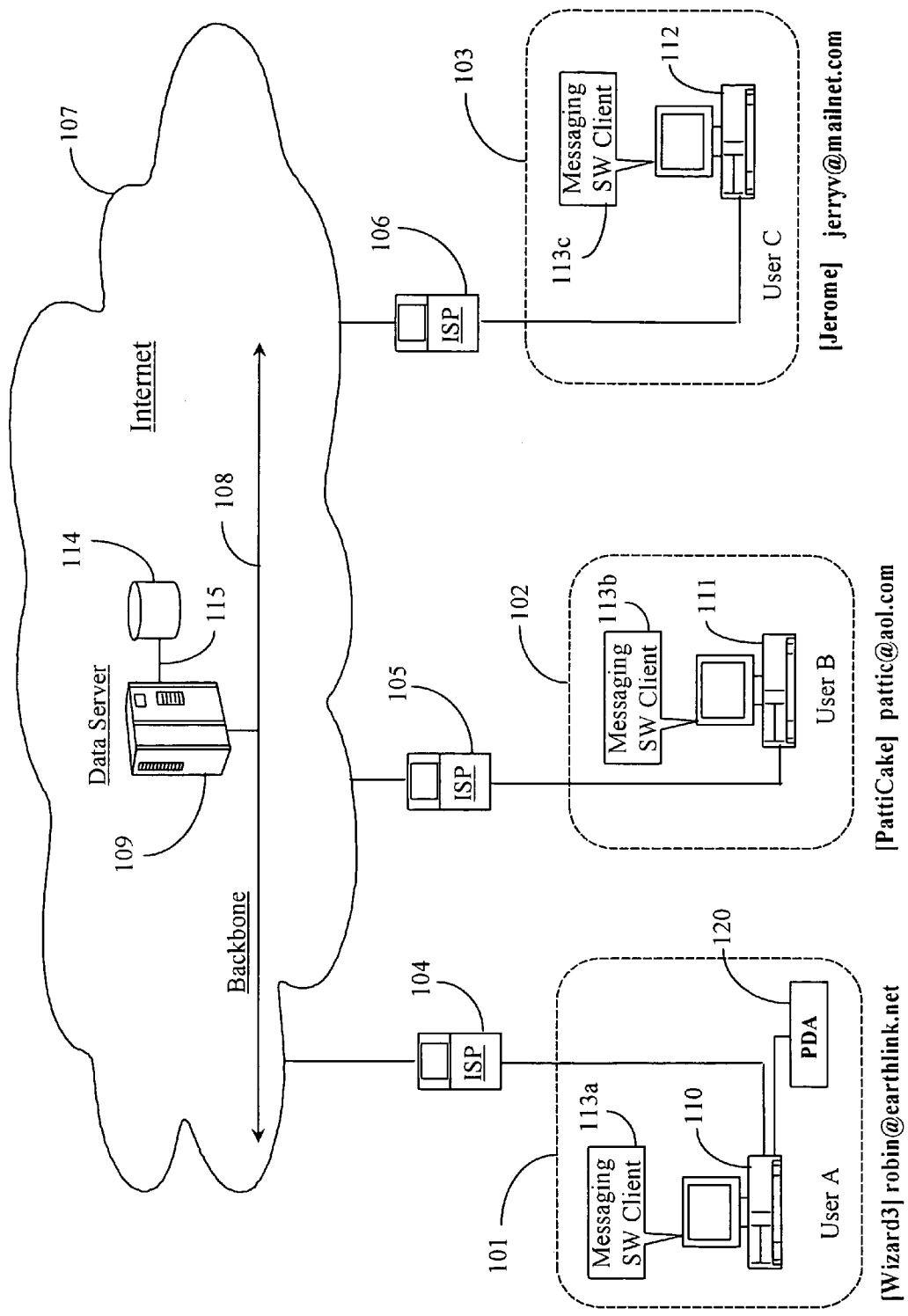
FIG. 1 is an architectural diagram of an instant messaging (IM) system operable according to an embodiment of the present invention.

FIG. 1 is an architectural diagram of a system operable according to an embodiment of the present invention. In the embodiment illustrated by FIG. 1 three user stations 101, 102 and 103, labeled user A, User B and User C respectively, are shown with personal computers (PCs) 110, 111 and 112 connected through Internet Service Providers (ISPs) 104, 105 and 106 respectively to the well-known Internet network represented as cloud 107. A single data server 109, representing one or more data servers in the Internet domain, is connected to a backbone 108 which represents the intricate interconnectivity in the Internet. A data repository 114 is shown connected to server 109 by a data link 115. Internet servers commonly have mass storage for data and code, and such storage capability may be a part of the server, may be implemented as separate unit accessible by the server, or may be a repository, or more than one repository accessible on the Internet by the server. There are many possibilities.

Each of computers 110, 111 and 112 has in this example an instance of an Instant Messaging (IM) logic, which may be software, according to an embodiment of the present invention installed and executable, indicated as instances 113a, 113b and 113c respectively. In the art such instances of software operable on a PC are often called clients, as in an email client, referring to the program that provides the email functions on a computer. It is not required that the IM functionality at a computer, such as instances 113a, 113b and 113c be entirely software. The logic for such a system may be provided by hardware, firmware or software, or by a combination thereof.

User's A, B and C in this example may be identified by email address and also by a screen name selected and assigned in association with the IM system by which the users are joined in the particular IM network of the invention. IM screen names are a common artifice in the art for identifying users and serving as initiators for messaging. These screen names are analogous to "handles" used by citizen band radio participants. In this particular example, user A is robin@earthlink.net, also using the screen name Wizard3; user B is pattic@aol.com, also using the screen name Patti-Cake; and user C is jerryv@mailnet.com, also using the screen name Jerome.

It will be apparent to the skilled artisan that there may be many more users in a broad-based IM system than the three users illustrated in the example of FIG. 1 shown to aid in the understanding of the invention. It will further be apparent to the skilled artisan that PCs 110, 111 and 112 may be computer appliances of another sort than PCs, such as computerized TVs, web-enabled cell phones or PDAs, or other types of digital appliances, for example. It will also be apparent to the skilled artisan that the illustration of connection through ISPs to the Internet is exemplary only, and there are a number of ways computerized appliances may attain Internet connectivity. It will be further apparent that the Internet representation is exemplary as well, and the network may be an Intranet or another sort of broadband network, among other sorts of networks. The simplified structure indicated is to illustrate principles and examples of the invention, and is not to be taken as illustrating limitations of the invention.

Figure 2:
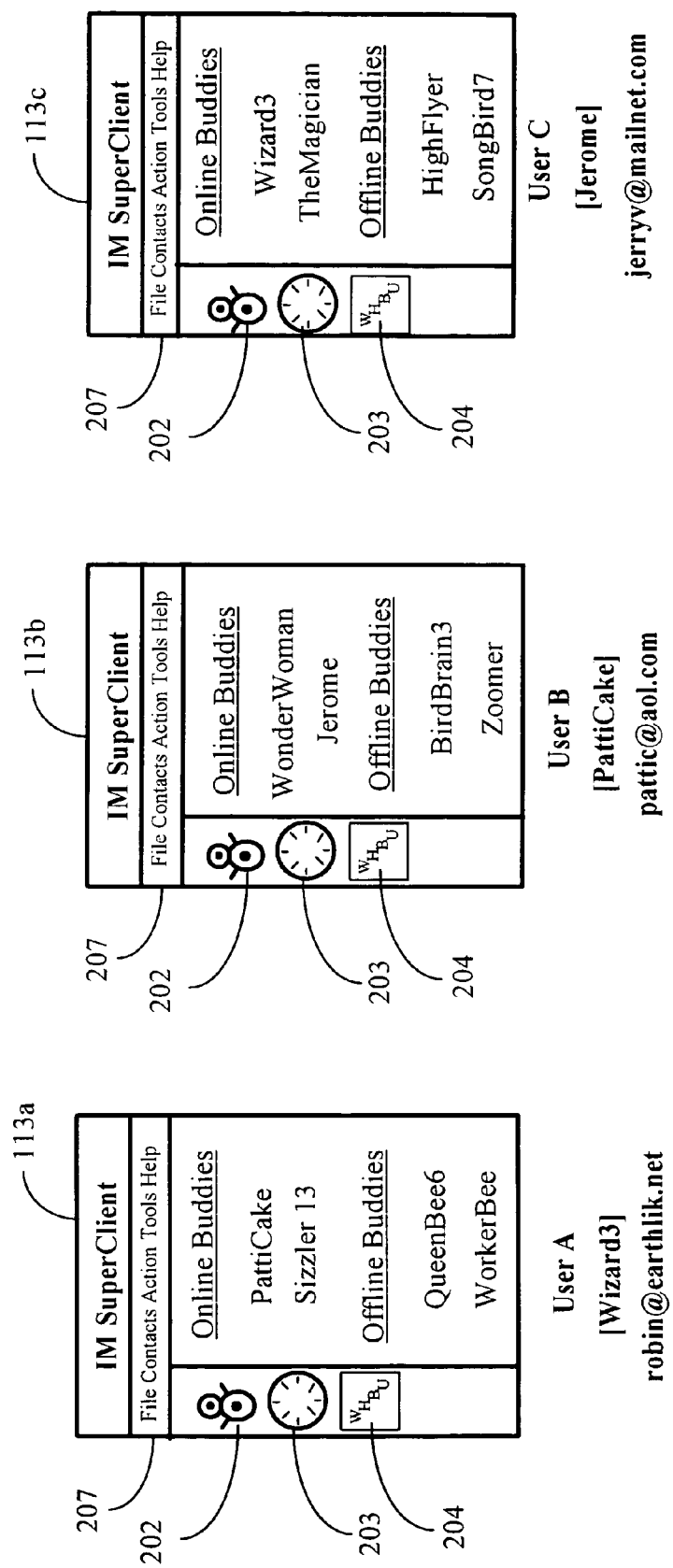
FIG. 2 is a diagram illustrating generally interactive screen displays for the IM system of FIG. 1 in an embodiment of the present invention.

FIG. 2 is a diagram illustrating generally interactive screen displays for IM clients 113a, 113b and 113c executing on computers 110, 111 and 112 for users A, B and C respectively, and buddy lists associated with each of the IM clients. The skilled artisan will recognize the form of the three screen displays as the general form for IM systems in the art, implemented as windows on a monitor desktop. It should be assumed for FIG. 2 that each instance of interactive display for instances 113a, 113b and 113c is displayed on a separate PC, these being PCs 110, 111 and 112 of FIG. 1 respectively.

In one embodiment of the invention, server 109 may be a server dedicated to the IM system consistent with principles of the present invention. In this embodiment, some functions of the system may be provided by server 109, and some by the instances of the IM system residing at and executing on individual ones of the user stations illustrated. A server dedicated to the IM network and system is not required in other embodiments of the invention, but may be used as a convenience, and in some embodiments there may be multiple such servers.

The IM system for the example embodiment of the present invention illustrated by FIG. 2 is given the name IM SuperClient for convenience, and the display for each instance is labeled accordingly. The name is arbitrary, and could be any one of many other names. This exemplary name applies also to FIG. 1 and to other embodiments of the invention described in this specification.

Each interactive display in FIG. 2 has a menu bar 207 which provides drop-down menus for the user to initiate actions. Such menu bars are common in the art and also for IM system displays. The exemplary menu headers shown are File, Contacts, Actions, Tools and Help. The file menu has commands for file functions. The Contacts menu has commands for functions to set up and manage contacts and contact lists, for example. The Actions menu has commands for actions, such as send a file, or send a text message, for example. The Tools menu is for commands to initiate such as configuration functions, and the Help menu provides access to help files describing how to use the system, for example.

Each interactive display in FIG. 2 has a link sidebar 201 with a set of links 202, 203 and 204. These interactive links are enabled as is known in the art to initiate an action when selected, typically by a user moving a cursor to the link and initiating a button on a pointer device such as a mouse device. The action may be to navigate to an Internet destination, for example, or to initiate another action locally. In some cases interactive links in sidebar 201 may duplicate actions or other menu functions available through drop-down menus from menu bar 207.

The links shown in this particular example are standard links for the IM system of the embodiment described with reference to FIG. 2, so the same links appear in each interactive display for the IM instances illustrated. In some cases links may vary, for example, by intervention of a user, who may cancel a link or institute a new available link provided by the system in the embodiment of the invention. To aid in the understanding of exemplary embodiments of the invention, common links are sufficient.

The skilled artisan will recognize that the links can be of many different sorts. Link 203, for example, may be a link to a time and weather service, which, when selected, will activate the user's default browser (if not already activated) and cause the browser to navigate to a Web site that provides weather and time information. Typically such links are provided in association with third-party providers for some consideration for directing Internet traffic to the provider's Web site.

Link 204 in this example may be a link to a radio station whose call letters are WHBU. There may additionally be links to news sites and the like, and such links are common in IM systems in the art. Link 202, appearing vaguely as a stick figure of a person, is a unique buddy link in this embodiment of the invention. Operation and function of this link is described below in further detail.

Each display for instances 113a, 113b and 113c shows buddy lists, and the buddy lists are separated into Online and Offline as is also common in the art. The buddy lists show screen names only for contacts for each user, and the contacts have been found and entered by each user as is common in the art. User A (Wizard3) shows contact buddies PattiCake, Sizzler 13, QueenBee6, and WorkerBee. PattiCake and Sizzler 13 are shown to be online and QueenBee6 and WorkerBee are shown as off line. Each instance of the IM system maintains a list of all contacts that have been entered. The listing in real time as on line and off line is a determination made by periodic checking by logic of the IM instance running on the particular PC or other computer appliance.

User B (PattiCake) has buddies WonderWoman and Jerome on line and BirdBrain3 and Zoomer off line. User C has Wizard3 and The Magician on line and HighFlyer and Songbird7 off line.

Note that User A, Wizard3, is on User Cs (Jerome) buddy list. Furthermore, User B (PattiCake is a buddy listed on User As buddy list. Still further, User C (Jerome) is a buddy on the lists of User B (PattiCake).

In an embodiment of the invention a unique function is provided that allows users access at least at some level to buddy lists of other users to expand communication opportunities. In this particular embodiment interactive link icon 202, active in each instance of IM SuperClient, initiates a function for such access. It is not necessary that an interactive icon be used for this initiation, as a menu selection in a drop down menu under, for example, Actions in menu bar 207 may provide the same function, and both mechanisms may be uses redundantly.

Figure 3:
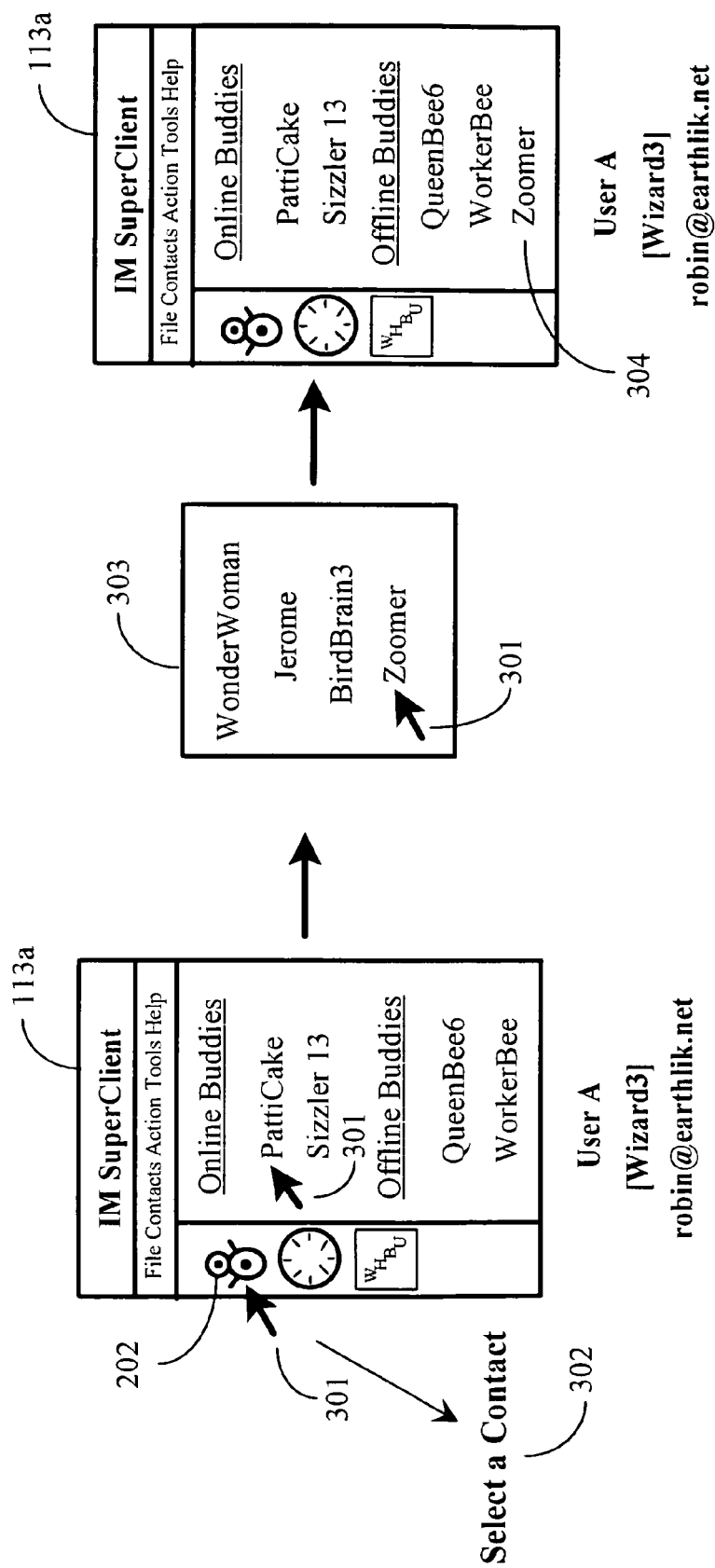
FIG. 3 is a diagram illustrating interactive screen displays and exemplary work flow in an embodiment of the invention.

FIG. 3 illustrates the unique browsing function in an embodiment of the invention. Beginning at the left of FIG. 3, the interactive interface for instance 113a for User A (Wizard3) is shown. Wizard3 moves cursor 301 to icon 202 and selects the interactive icon to initiate the browser function. At the selection of the icon a text message 302 appears directing Wizard3 to select a contact in his/her buddy lists. Wizard3 now moves cursor 301 to PattiCake and selects that entry. As a result of Wizard3 selecting PattiCake a window 303 is displayed for Wizard3 listing at least a portion of PattiCake's buddy list (see User B in FIG. 2).

The functionality in this example is that a message is sent to PattiCake identified as a query for her buddy lists, and PattiCake's instance of IM SuperClient responds to the message by returning her buddy list, along with associated contact codes, which may be IP addresses, that will allow Wizard3 to add individual ones of PattiCake's buddies to his own buddy lists, and to message these additions directly.

Returning again to FIG. 3, Wizard3, viewing window 303 provided by PattiCake's instance of IM SuperClient, now moves cursor 301 to Zoomer and selects that entry. Zoomer automatically adds to Wizard3's buddy list as shown on the right side of FIG. 3. Zoomer is shown as off line, just as in PattiCake's buddy lists, but Wizard3's instance of IM SuperClient will now track online/offline for Zoomer. Moreover, the necessary code for Zoomer is added to Wizard3's instance of IM SuperClient so Wizard3 can message Zoomer. Still further, and importantly, Wizard3 may now use the unique browser functionality described above to access Zoomer's buddy lists (not shown), and may proceed through an expanding network of new contacts added in the same way.

Returning now to FIG. 2, it should be clear that the unique browser functionality just described with reference to FIG. 3 may be used by any one of the three users shown through their own instances of IM SuperClient, and any and all of the interconnected users in the IM SuperClient network may do the same, adding significantly to the ability of users to expand the network both in size and interconnectivity.

The rather simple and direct embodiment of the invention described above may be different in other embodiments to accommodate privacy and sensitivity issues important to many users. For example, in one embodiment addition to a browsing user's buddy lists through an intermediary may not be automatic.

Figure 4:
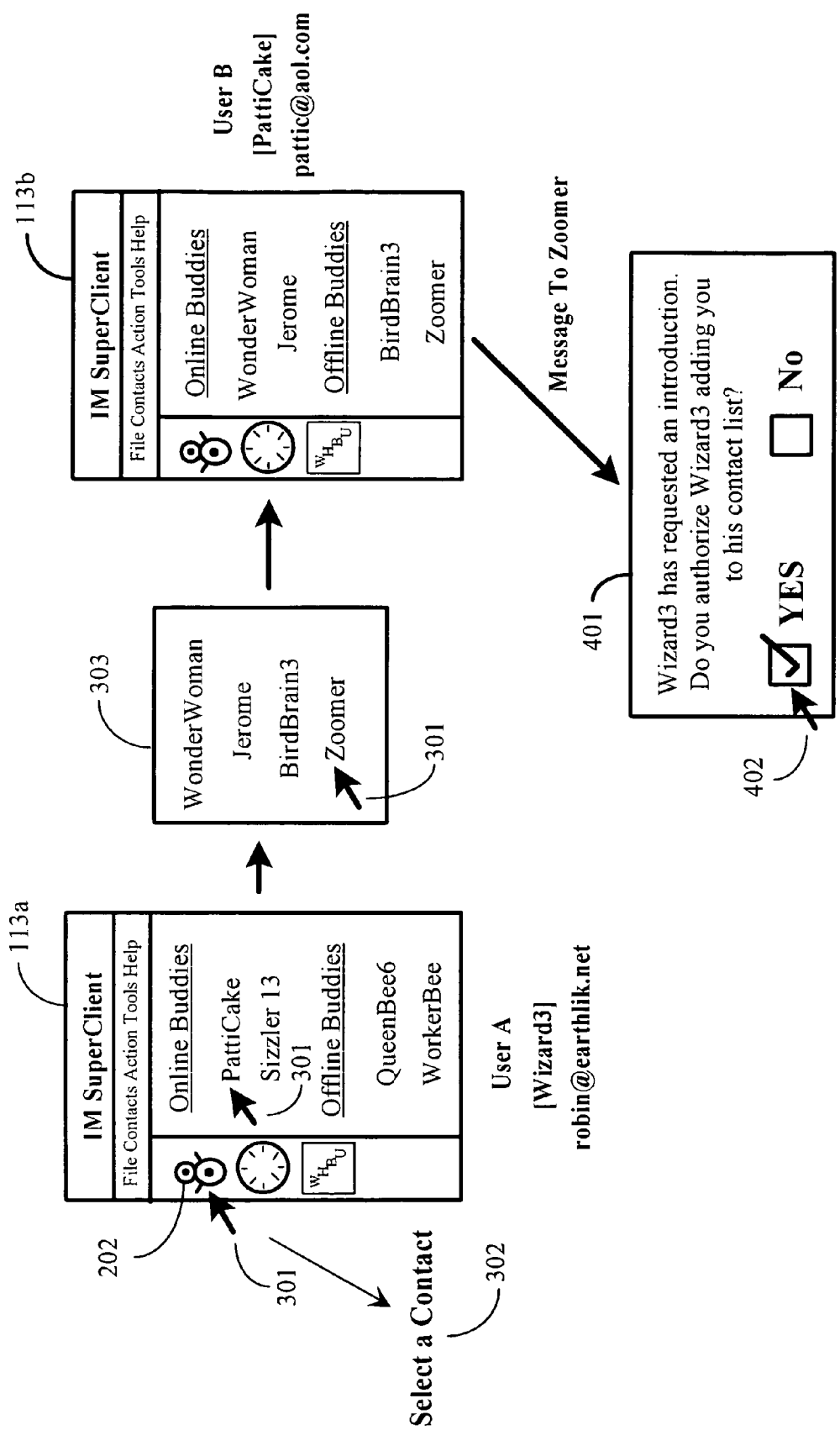
FIG. 4 is a diagram illustrating interactive screen displays and exemplary workflow in another embodiment of the invention.

FIG. 4 is a diagram similar to the diagram of FIG. 3 up to the selection of Zoomer in window 303. In this embodiment, when Wizard3 selects Zoomer in window 303, a communication goes to PattiCake, whose instance of IM SuperClient now sends a message to Zoomer (Zoomer is a legitimate contact for PattiCake), illustrated in FIG. 4 as window 401. The message in this example seeks Zoomer's permission to be added to Wizard's contact list.

If Zoomer is willing, he/she may move cursor 402 to the appropriate box and select, perhaps leaving a check in the box, and a message goes back to PattiCake's instance of IM SuperClient authorizing a message to Wizard3 with appropriate code allowing Wizard3's instance to add Zoomer as a contact.

The embodiment described just above with reference to FIG. 4 is a rather minimum change for privacy functionality, and might not be supported by many users. For example, Zoomer may well want to get some information about Wizard3 before deciding whether or not to authorize addition of his name to Wizard3's buddy lists, and Wizard3 to his own. This can be handled in several ways. For example, assuming individual instances of IM SuperClient that maintain a buddy list also associate at least contact information, and in some cases more personal information as a user profile with individual ones of the names in the buddy list, the functionality may be that Wizard3, in browsing PattiCake's buddy lists, automatically authorizes PattiCake's instance to provides his contact information, or more extensive user profile to Zoomer when he selects Zoomer in PattiCake's buddy list; and PattiCake's instance, in sending the query to Zoomer as a result, also sends along Wizard3's information for Zoomer to consider. In many cases this information may be in PattiCake's user profile for Wizard3 (presumably Zoomer is in PattiCake's buddy list, because she is in his buddy lists).

In some other embodiments the system may enable Wizard3 to attach a special user profile to his request to add Zoomer. In this case the special file might be directed to a particular interest that Wizard3 is pursuing, which may, in some cases be a temporary interest, and Wizard3 is then in control of editing this particular introductory profile, or of selecting among two or more such profiles when browsing other contact's buddy lists.

In a buddy-browsing situation, as enabled by various embodiments of the invention described in this specification, the instance of IM SuperClient contacted for the purpose of browsing, as described above with Wizard3 contacting PattiCake and browsing her buddy lists, may be termed an intermediary. In some embodiments of the invention the intermediary acts as a mediator in the browsing process.

Figure 5:
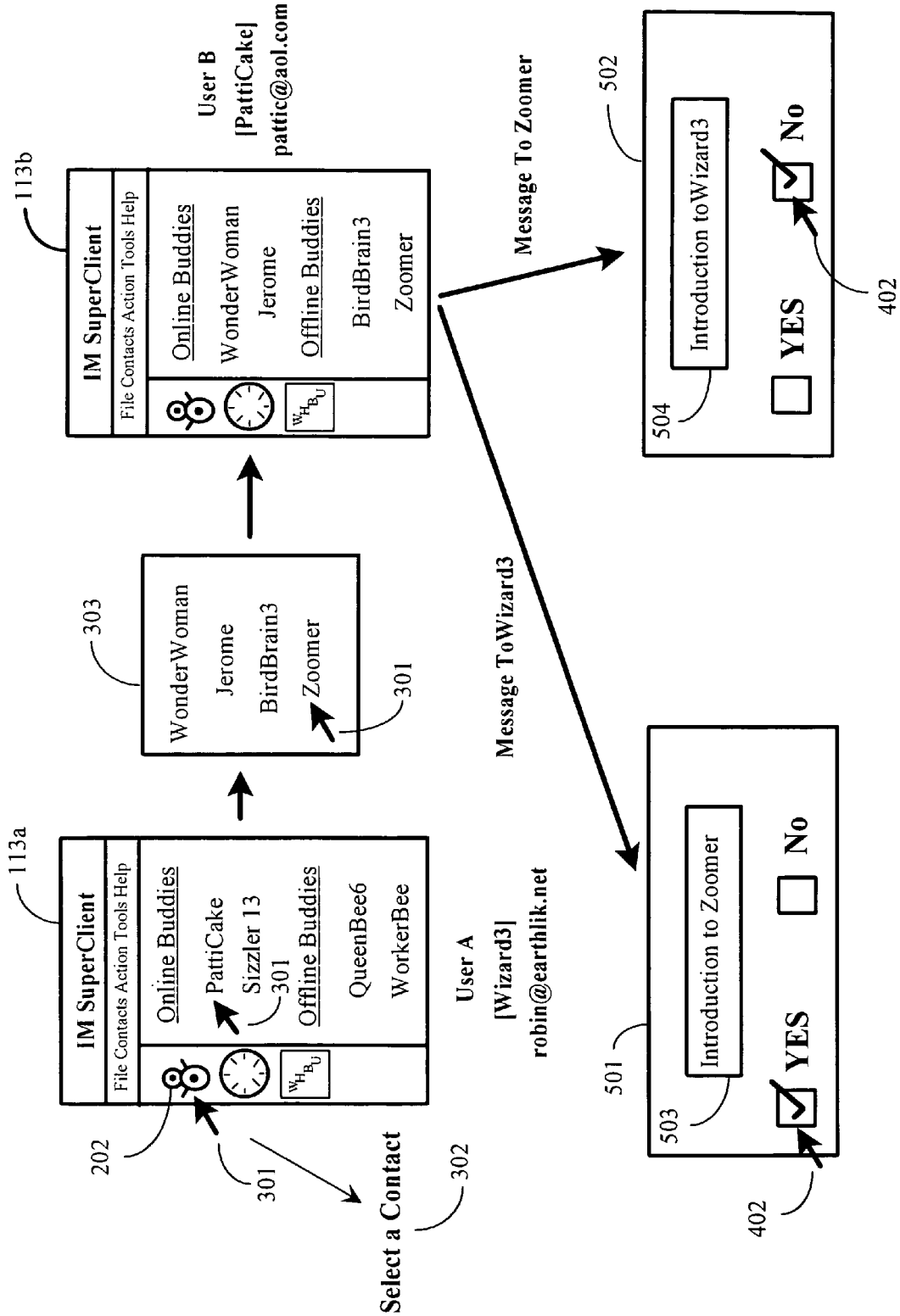
FIG. 5 is a diagram illustrating interactive screen displays and work flow in yet another embodiment of the invention.

FIG. 5 shows an embodiment similar to the embodiment described above with reference to FIG. 4, up to the point of PattiCake's response after Wizard3 selects Zoomer in PattiCake's buddy list. In this embodiment PattiCake acts as an intermediary, and produces two messages 501 and 502, one each to Wizard3 and Zoomer, providing a suitable introduction 503 and 504 respectively of each to the other, using information provided and authorized by each for the purpose. These messages can take any of a variety of forms, and may include from simple contact information up to and including details about each person and his or her interests. There may be check boxes as shown for response to these introductory messages, and this response may take any of several forms as well. In this particular example Yes/No check boxes are provided for response. A yes response would indicate the responder is amenable to the reciprocal addition of names to buddy lists of the two. Two yes's in response causes PattiCake's instance to provide the necessary data, and the instances for Wizard3 and Zoomer to use that data to make the buddy list addition.

In some embodiment of the invention buddy lists may be divided into categories according to certain characteristics, such as work buddies, family buddies, basketball buddies, and the like. In this case individual entries may appear in more than one category. In such an embodiment a user may configure his/her own instance of IM SuperClient to grant or deny access to third party contacts for the purpose of initiating buddy list expansion according to embodiments of this invention. A user, for example, may enable his/her basketball friends list to be accessed and browsed by others, but may not wish to expose his/her family list to browsing. Access configuration may be absolute, in that, for example, access to a family list may be blocked from all third party browsing; or may be relative, in that family browsers may be granted access to other user's work friends, but not to certain other categories. In other embodiments access may be granted or withheld on an individual basis, such as certain family buddies who might be wanting to expand their own buddy lists, but not to certain other family buddies who wish to retain their relative privacy.

In another aspect of the invention buddy list expansion may be promoted by a novel search function provided with an IM client according to an embodiment of the present invention, which is referred to in this specification as an IM SuperClient. Referring back to FIG. 1, server 109 was described as possibly being a server dedicated to the IM system in some embodiments of the present invention. In this case data storage repository 114 may be dedicated to data pertinent to the IM system in embodiments of the invention, and to information about subscribers to and users of the system.

Referring now to FIGS. 2-5, it was described above that icon 202 might be a link to activate the novel buddy browsing system in embodiments of the present invention. In another embodiment selecting icon 202 by a user in his/her interactive interface initiates a novel search function provided to enhance expanding contacts for users of the system. In this embodiment and similar embodiments individual ones of users of the IM SuperClient and its IM network may provide a description of himself/herself and a user profile that may include personal details, history details, individual interests, professional affiliations, career goals, occupation details and the like. This information may be stored, for example, in a database on repository 114 accessible to server 109, the server in this instance at least partly dedicated to the IM SuperClient network and functions.

Figure 6:
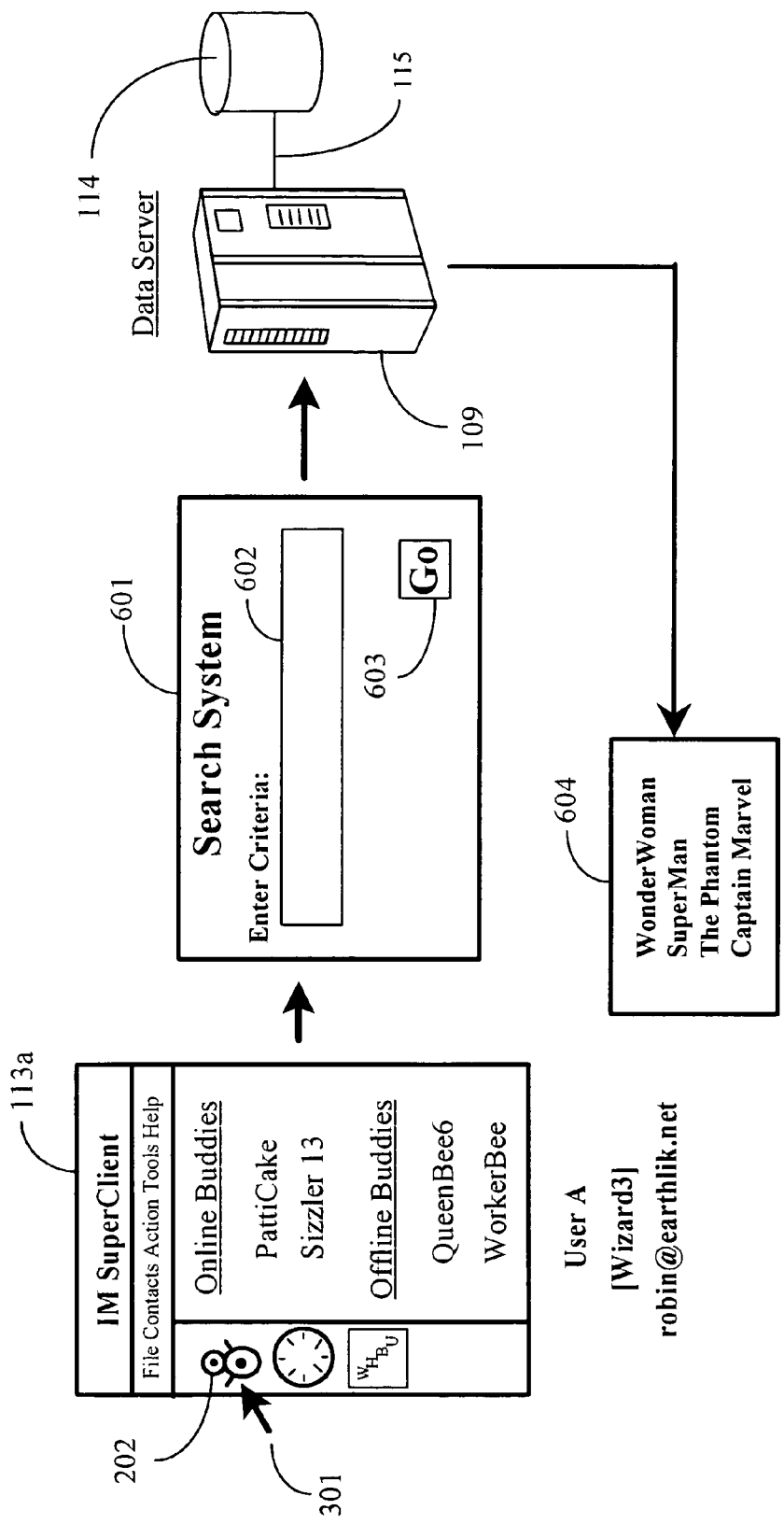
FIG. 6 is a diagram illustrating interactive displays and work flow in an embodiment of the invention incorporating a search flow in an embodiment of the invention.

In one embodiment individual instances of IM SuperClient provide a search function that may be initiated, for example, by selecting icon 202. In some embodiments there may be separate icons for the search function and for the browser functionality described above in embodiments of the invention. When a user selects the search function in an embodiment of the present invention, as shown in FIG. 6 with cursor 301 and a pointer device, a search criteria box 601 appears in the user's interactive interface. The search criteria can take many forms, from a simple entry field 602, for a user to enter key words or phrases, to more sophisticated systems, such as a Boolean system in which a user may enter terms, including abbreviations, for certain categories of criteria, such as age or city, followed by limiting criteria. An example might be "age\18-36\city\newyork\occ\diskjocky\gen\male", which might be expected to return contact info for all male disk jockeys in New York City between the ages of 18 and 36 who are members of the network.

In such an embodiment Help screens might be available for users, with examples of use and abbreviations and the like, for a user's aid until familiar with the system. There are many other ways that search criteria might be entered and used in various embodiments of the invention, and the details and examples given here are exemplary only.

In the particular embodiment shown in FIG. 6 a Go button 603 is provided for the user to initiate a search of data stored about users following the criteria entered in box 601. Once a user enters the criteria and selects Go, the query goes to server 109 in this embodiment, which initiates a search of data in repository 114 and returns users 604 that match the criteria in the search. Many sorts of databases and search functionality are known in the art which might be employed in a system according to this and other embodiments of the invention.

In some embodiments, data about users is stored at individual user's instances of IM SuperClient, which might be, for example, for just those contacts, or for individual ones of the contacts in that user's buddy lists. In this case the search function will require a user to select a contact, such as Patti-Cake, as shown in FIG. 4, and the IM instance then provides a criteria box 601 which will receive criteria and initiate a search just of those authorized on PattiCake's instance.

In some cases the browsing and search functions described in various embodiments may work together and in serial or parallel. Such an embodiment might be likened to the card game of Fish, where one user may query another for female disk jockeys, and the selected contact may search its own database, and failing to return a hit, direct the querying user to another contact, or to a database. There are many possibilities. In some embodiments the search may take place with each input component (e.g. keystroke entry) of the searching user providing the search query, which may allow a search to take place relatively rapidly. In another embodiment spellchecking may be performed on user names or search entries for users, allowing the IM system to select the most relevant user or users identifiable by the system.

In some embodiments of the invention, the IM SuperClient system and network may store one or more telephone numbers, physical address or addresses, such as for residence or work, email addresses, screen names or a combination of these and/or other identifying information of one or more users. As such, a user may search for other users using a telephone number, for example, and/or other identifying data. There may be many cases, for example, where one user of the IM SuperClient has just one or two pieces of information, for example, and wished to find the user to whom the one or two pieces of information might pertain.

In one embodiment, the search function of the IM SuperClient may be enabled to accept criteria and search the network in the embodiment for one or more contacts stored in a cellular telephone, a personal digital assistant (PDA), a computer or another device. In this embodiment the user can connect such a device to the instant messaging network, such as through a wireless network link or a computer system coupled to the instant messaging network, using for example Universal Serial Bus (USB) connectivity, and may perform an automatic search for some or all of the user's contacts stored by the device. A similar search may be performed using other contact information, such as a physical address. A user's PDA, for example, may have a well-developed contact list not stored as contacts in the IM SuperClient system in embodiments of the invention. This feature in such an embodiment makes it easy for a user to search using such devices, because without this feature, it would be necessary to enter data for the search in each case in a search criteria window such as window 601 of FIG. 6. As an example, a PDA 120 is shown connected to PC 110 in FIG. 1.

Additionally, in some embodiments of the invention, users may be enabled to restrict or grant access to other users (or user/buddy groups) to search their description, contact information, etc., in a number of ways. For example, a user may only grant search of their telephone number to a certain group of other users: e.g., those who have also agreed to share their telephone number, those having a particular profile (e.g., geographic location, area code, gender, occupation, buddy list category etc.). In one embodiment, users can allow their instant messaging screen names to be visible to other users viewing a web page simultaneously with that user.

As can be seen, a variety of functionality and methods according to embodiments the present invention may be provided. For example, one method for facilitating communication in an instant messaging network according to the present invention comprises providing a first user in an instant messaging network a buddy list in which the first user maintains a list of buddies including a second user, and allowing a third user to access the buddy list of the first user, as described above with reference to FIG. 2. In such a method, or in another method according to the present invention, a mechanism to allow the first user to facilitate exchange of information between the third user and the second user may also be provided. Such a mechanism may comprise, without limitation: mechanisms that allow the first user to provide a first contact information relating to the third user (for example, an email address of the third user, screen name identifying or associated with the third user, or profile information for the third user) to the second user; mechanisms that allow the first user to provide a first contact information relating to the second user (for example, an email address of the second user, screen name identifying or associated with the second user, or profile information for the second user) to the third user; or a mechanism that may otherwise allow an exchange of information.

It should be appreciated that reference throughout this specification to one embodiment or an embodiment or an aspect of the invention means that a particular feature, structure or characteristic described in connection with the embodiment is included in at least one embodiment of the present invention. Therefore, it is emphasized and should be appreciated that two or more references to an embodiment or one embodiment or an alternative embodiment or an aspect in various portions of this specification are NOT necessarily all referring to the same embodiment. Furthermore, the particular features, structures or characteristics of one or more embodiments or aspects described may be combined or implemented independently of each other as suitable in one or more embodiments of the invention.

It will be apparent to one of ordinary skill in the art that aspects of the invention, as described above, may be implemented in many different forms of software, firmware, and hardware in the implementations illustrated in the figures and described with reference to the figures or without reference to the figures in the specification. The actual software code or specialized control hardware used to implement aspects consistent with the present invention is not limiting of the present invention. Thus, the operation and behavior of the aspects were described without reference to the specific software code, it being understood that a person of ordinary to skill in the art would be able to design software and control hardware to implement the aspects based on the description without having to invent anything novel, simply.

The above description of preferred embodiments of the present invention provides illustration and description, but is not intended to be exhaustive or to limit the invention to the precise form or forms disclosed. Modifications and variations are possible in light of the above teachings or may be acquired from practice of the invention, and will generally fall within the spirit and scope of the invention.

No element, act, or instruction used in the description of the present application should be construed as critical or essential to the invention unless explicitly described as such. Also, as used herein, the article "a" is intended to include one or more items. Where only one item is intended, the term "one" or similar restrictive language is used.

It should further be appreciated that, in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the disclosed invention(s) requires all features discussed. Rather, as reflected, inventive aspects lie in less than all features of a single foregoing disclosed embodiment.

For the above reasons the scope of the invention is limited only by the claims which follow.

What is claimed is:

1. An instant messaging (IM) system comprising:
   an IM server connected to a communication network; and
   processor of the IM server to execute logic operable on the IM server enabling a first user to browse contacts associated with a second user, wherein the logic enables the second user to act as an intermediary client between the first user and a third user in response to a request by the first user to add the third user, which is a contact associated with the second user, as a contact of the first user.

2. The IM system of claim 1 wherein the network is the Internet network.

3. The IM system of claim 1 wherein the logic additionally enables the first user to add and list contacts accessed by browsing the contacts associated with the second user.

4. The IM system of claim 1 wherein the second user groups contacts in distinct separate lists, and the first user is enabled to browse contacts in only the second user's list that includes the first user as a contact.

5. The IM system of claim 4 further comprising a means operable for the second user to enable and disable access by the first user to individual ones or lists of contacts associated with the second user.

6. The IM system of claim 1 further comprising a means for the first user to select a screen name from the contacts of the second user, which selection adds the selected screen name as a contact for the first user.

7. The IM system of claim 6 wherein the means for a user to select a screen name is an interactive list displayed to the first user on a display screen of a first computerized appliance connected to the communications network and executing a first instance of client logic of the IM system.

8. The IM system of claim 7 wherein the second user's contacts are stored and displayed on a second computerized appliance executing a second instance of client logic of the IM system.

9. The IM system of claim 8 wherein, upon the first user selecting a screen name from the contact list of the second instance, the second instance sends a message to a third instance of the IM client on the network, the third instance registered to a person using the selected screen name, the message alerting the person using the selected screen name that the first user is adding the name of the person to the first user's contact list.

10. The IM system of claim 9 wherein the second instance, upon the first user selecting a name from the contact of the second instance, acts as an intermediary, sending at least a message to a third instance of the IM client registered to the person using the selected screen name, the message seeking approval for addition of the selected screen name to the contact list of the first instance.

11. The IM system of claim 10 wherein the second instance, upon the first user selecting a screen name from the contact list of the second instance, sends messages to both the third instance registered to the person using the selected screen name, and also to the first user at the first instance, providing introductory information to each of the two users about the other of the two users.

12. The IM system of claim 11 wherein the two messages sent also seek response from the two users granting or withholding authorization for the addition of each user's screen name to the other user's contact list.

13. The IM system of claim 1, wherein the second user acts as an intermediary through a client associated with the second user.

14. The IM system of claim 13, wherein the client is an instance of an IM client.

15. A method for expanding an instant messaging (IM) system comprising:
   providing, at a computer system, at least first and second instances of an IM client on first and second computerized appliances respectively on a network; and
   providing, at the computer system, a browsing means in the first instance of the IM client to allow browsing screen names in a contact list of the second instance by a first user of the first instance, wherein the second instance acts as an intermediary between the first instance and a third instance in response to a request by the first user to add the third instance, which is a contact in the contact list of the second instance, as a contact in a contact list of the first instance.

16. The method of claim 15 further comprising initiating the browsing unction by selecting one of a menu line item or an interactive icon in an interactive interface on a display screen one of the computerized appliances.

17. The method of claim 15 wherein the network is the Internet network and one or more of the computerized appliances are personal computers connected to the Internet.

18. The method of claim 15 further comprising a user of the second instance enabling or disabling access by the browsing user of the first instance for individual ones or groups of contacts in contact lists of the second instance.

19. The method of claim 15 further comprising selecting a screen name from the contact list of the second instance, which adds the selected screen name as a contact in the contact list of the first instance.

20. The method of claim 19 further comprising displaying an interactive list of contacts from a contact list of the second instance in a display window of the first computerized appliance.

21. The method of claim 19 comprising the second instance, upon the first user selecting a name from the contact list of the second instance, sending a message to a third instance of the IM client on the network, the third instance registered to the person using the selected screen name, the message alerting the person using the selected screen name that the first user is adding the name of the person to the first user's contact list.

22. The method of claim 19 comprising the second instance, upon the first user selecting a name from the contact of the second instance, acting as an intermediary, sending at least a message to a third instance of the IM client registered to the person using the selected screen name, the message seeking approval for addition of the selected screen name to the contact list of the first instance.

23. The method of claim 22 comprising the second instance, upon the first user selecting a screen name from the contact list of the second instance, sending messages to both the third instance registered to the person using the selected screen name, and also to the first user at the first instance, providing introductory information to each of the two users about the other of the two users.

24. The method of claim 23 wherein the two messages sent also seek response from the two users granting or withholding authorization for the addition of each user's screen name to the other user's contact list.

25. A method for expanding an IM network, comprising:
providing, at a computer system, network communication between a first and second user such that each is listed by the other as a contact; and
making, at the computer system, other contacts of the first user available for selection by the second user for addition to the second user's contact list, wherein the first user acts as an intermediary client between the second user and a third user in response to a request by the second user to add the third user, which is a contact of the first user, as a contact of the second user.

26. The method of claim 25 wherein the network is the Internet network.

27. The method of claim 25 wherein the first user groups contacts in distinct separate lists, and the second user is enabled to browse contacts in only the first user's list that includes the second user as a contact.

28. The method of claim 27 further comprising the first user enabling and disabling access by the second user to individual ones or lists of contacts associated with the first user.

29. The method of claim 25 further comprising the second user selecting a screen name from the contacts of the first user, which selection adds the selected screen name as a contact for the second user.

30. The method of claim 25 wherein the second user selects a screen name from the contact list of the first user, and the first user causes a message to be sent to a third user, the third user being the person using the selected screen name, the message alerting the third user that the second user is adding the third user to the second user's contact list.

31. The method of claim 25 wherein the first user, upon the second user selecting a name from the contact of the first user, acts as an intermediary, sending at least a message to a third user being the person using the selected screen name, the message seeking approval for addition of the selected screen name to the contact list of the second user.

32. The method of claim 25 wherein the first user, upon the second user selecting a screen name from the contact list of the first user, sends messages to both the third user, being the person using the selected screen name, and also to the second user providing introductory information to each of the second and third users about the other of the second and third users.

33. The method of claim 32 wherein the messages sent also seek response from the second and third users granting or withholding authorization for the addition of each user's screen name to the other user's contact list.

34. A machine-readable storage medium having stored thereon a set of instructions that cause a machine to perform a method for expanding an IM network comprising:
providing network communication between a first and second user such that each is listed by the other as a contact; and
making other contacts of the first user available for selection by the second user for addition to the second user's contact list, rein the first user acts as an intermediary client between the second user and a third user in response to a request by the second user to add the third user, which is a contact of the first user, as a contact of the second user.

35. The medium of claim 34 wherein the network is the Internet network.

36. The medium of claim 34 wherein the second user groups contacts in distinct separate lists, and the first user is enabled to browse contacts in only the second user's list that includes the first user as a contact.

37. The medium of claim 36 further comprising the second user enabling and disabling access by the first user to individual ones or lists of contacts associated with the second user.

38. The medium of claim 34 further comprising the first user selecting a screen name from the contacts of the second user, which selection adds the selected screen name as a contact for the first user.

39. The medium of claim 34 wherein the second user selects a screen name from the contact list of the first user, and the first user causes a message to be sent to a third user, the third user being the person using the selected screen name, the message alerting the third user that the second user is adding the third user to the second user's contact list.

40. The medium of claim 34 wherein the first user, upon the second user selecting a name from the contact of the first user, acts as an intermediary, sending at least a message to a third user being the person using the selected screen name, the message seeking approval for addition of the selected screen name to the contact list of the second user.

41. The medium of claim 34 wherein the first user, upon the second user selecting a screen name from the contact list of the first user, sends messages to both the third user, being the person using the selected screen name, and also to the second user providing introductory information to each of the second and third users about the other of the second and third users.

42. The medium of claim 41 wherein the messages sent also seek response from the second and third users granting or withholding authorization for the addition of each user's screen name to the other user's contact list.

* * * * *